(No Model.)
H. CALDWELL.
FRUIT GATHERER.
No. 435,393. Patented Sept. 2, 1890.
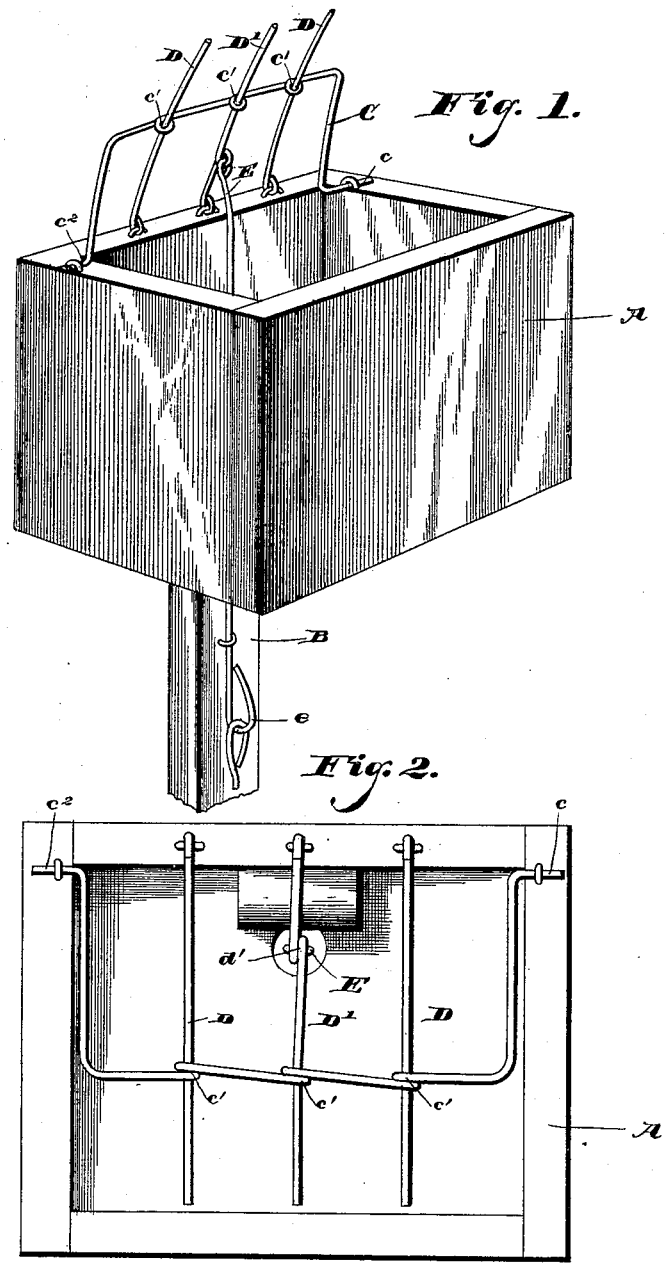
Witnesses
Samuel Ker.
J. Edgar Smith
Inventor
Harper Caldwell
By his Attorneys.
C. A. Snow & Co.

United States Patent Office.

HARPER CALDWELL, OF PINEVILLE, MISSOURI.

FRUIT-GATHERER.

SPECIFICATION forming part of Letters Patent No. 435,393, dated September 2, 1890.

Application filed May 6, 1890. Serial No. 350,848. (No model.)

*To all whom it may concern:*

Be it known that I, HARPER CALDWELL, a citizen of the United States, residing at Pineville, in the county of McDonald and State of Missouri, have invented a new and useful Fruit-Gatherer, of which the following is a specification.

My invention is an improvement in fruit-gatherers, and has for its object to provide a fruit-gatherer which will be simple and easily constructed and effective in operation.

With these objects in view the invention resides in the various novel features and in the combination of parts.

In the drawings, in which I have illustrated my invention, Figure 1 is a perspective view of my improved gatherer, and Fig. 2 is a plan view of the same.

In the drawings, A designates a box or receptacle for fruit, to which is attached a staff B of suitable length, having its lower end shaped to form a handle.

At the top of the box A is pivoted a wire frame C. The frame C is preferably constructed as shown—i. e., having a shank $c$, retained by a staple in the box A, bent near said shank to form a right angle therewith and brought to or about the center of the box and there bent at a right angle across the box, and is here curved into eyelets $c'$ $c'$ $c'$, bent again at a right angle on the other side of the box and then bent outwardly at right angles to form another shank $c^2$, which also is retained to the box A by a staple. To the box A are also pivoted the independent hooks or tines D D' D, which may be of any number. These tines D D' D project through the eyelets $c'$ $c'$ $c'$, and one of them, as D', is bent into an eyelet $d'$. These independent tines may readily be removed, repaired, or replaced.

To the eyelet $d'$ is attached one end of a wire or rod E, which passes through an opening in the box A, and, guided by staples, is conducted along the staff B to any convenient place near the handle, where it is provided with a loop $e$. It will be seen that by means of this rod E the hooks or fingers D may be made to close upon the box or to rise above it.

I use my device as follows: In gathering fruit desirable specimens may be out of ordinary reach. The fruit-gatherer here comes in play. Taking it by the handle and raising the hooks D by shoving the rod E upward, the box A is brought under the desired fruit. The hooks D are now lowered by pulling upon the rod E, thus inclosing the fruit in the box, and by a pull or downward movement the fruit is detached from its stem and may be taken from the box sound and uninjured. Should a hook or tine D be broken or bent it may readily be removed and another put in its place.

Having thus fully described my invention, what I claim as new, and desire to secure by Letters Patent, is—

In a fruit-gatherer, the combination, with the box or receptacle A, of the tines D, independently hinged thereto, the wire frame C, also hinged to said receptacle and bent to form eyelets $c'$, through which the tines D project, and the rod E, attached to one of the tines by an eyelet therein, substantially as and for the purpose specified.

In testimony that I claim the foregoing as my own I have hereto affixed my signature in presence of two witnesses.

HARPER CALDWELL.

Witnesses:
WILEY W. TRACY,
DANIEL THRASHER.